United States Patent [19]

Yamada

[11] Patent Number: 5,079,585
[45] Date of Patent: Jan. 7, 1992

[54] CAMERA DATA STORAGE APPARATUS WITH POWER CUT OFF PROTECTION

[75] Inventor: Masatoshi Yamada, Nagano, Japan

[73] Assignee: Chinon Kabyshiki Kaisha, Nagano, Japan

[21] Appl. No.: 603,433

[22] Filed: Oct. 26, 1990

[30] Foreign Application Priority Data

Nov. 7, 1989 [JP] Japan .................. 1-289292

[51] Int. Cl.⁵ .............................................. G03B 7/26
[52] U.S. Cl. .................................................. 354/484
[58] Field of Search .................................... 354/484

[56] References Cited

U.S. PATENT DOCUMENTS 4,733,265  3/1988  Haraguchi et al. ............... 354/484

FOREIGN PATENT DOCUMENTS 60-61731  4/1985  Japan .

Primary Examiner—Michael L. Gellner

[57] ABSTRACT

The invention relates to a data storage unit of a camera which includes a power failure protection system which ensures that data written into the data storage unit, during the occurrence of power failure, is not lost. Film count data is stored successively in three memory address locations and comparison of the correspondence of the film count data is utilized to generate and rewrite corrected film count data. In regard to shutter exposure and film wind commands, both commands and inverted forms therein are stored and comparison of inversion relationships are used to determine if the data is correct. Thereafter, the correctly determined data is utilized to generate and rewrite corrected data.

21 Claims, 3 Drawing Sheets

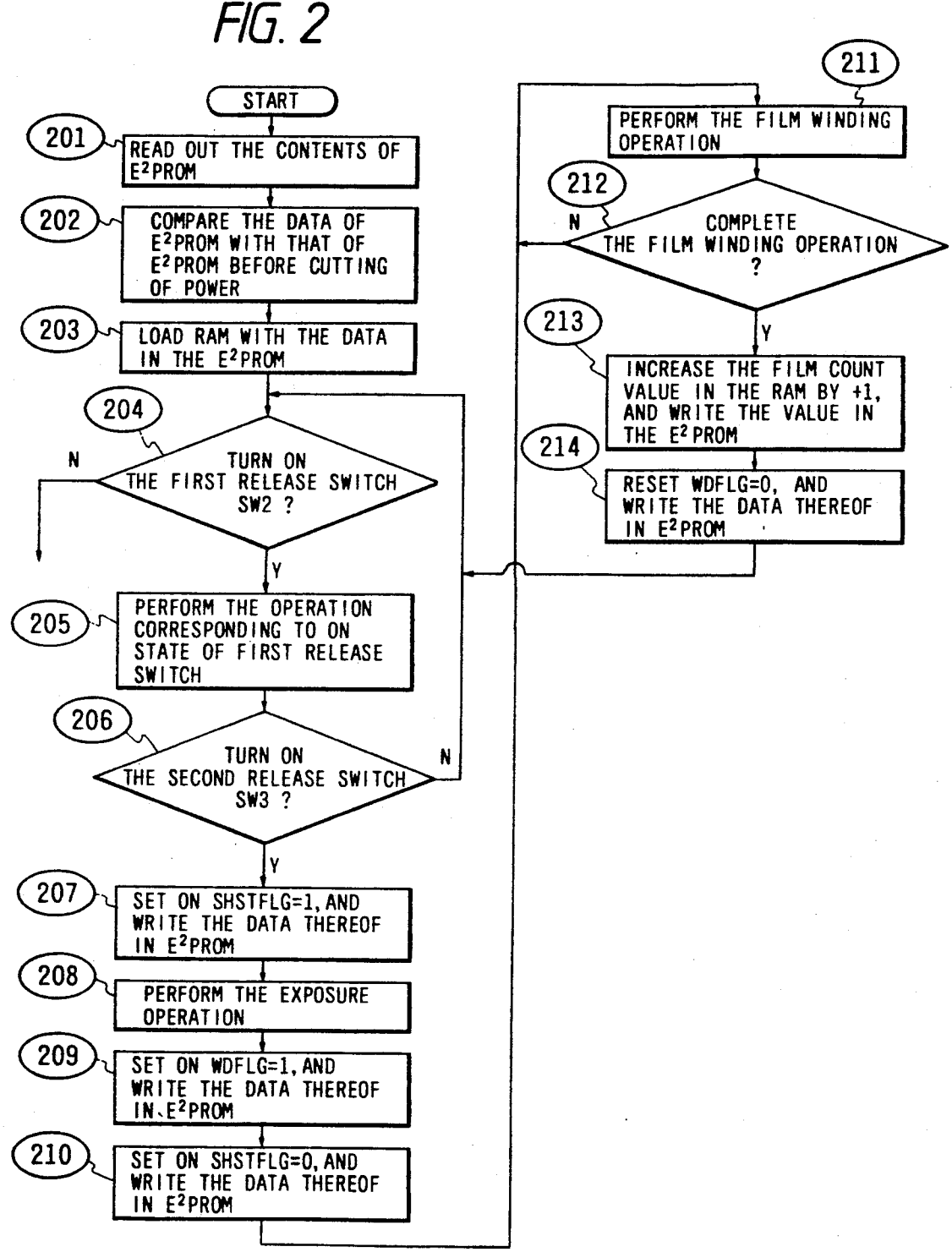

CAMERA DATA STORAGE APPARATUS WITH POWER CUT OFF PROTECTION

BACKGROUND OF THE INVENTION

1. Field of the Invention

This invention relates to a data storing unit for a camera which operates to store film count data and data necessary for operating the camera.

2. Description of the Background Art

A microcomputer is generally used to control a variety of operations of a camera. In this connection, it is necessary to use a memory for storage and renewal of the various data required for control of the microcomputer. The memory is generally a RAM (random access memory) integral with the microcomputer. The RAM is volatile and therefore lose its contents when the power supply is cut off. Accordingly a non-volatile memory which does not lose its contents even if the power supply is turned off (hereinafter referred to as "an E$^2$PROM," when applicable) is employed together with the microcomputer. Film count data generated as corresponding to every film winding operation and various data necessary for the operations of the camera, such as data representing the shutter's exposure operation and data indicating the fact that the film is being wound or rewound, are stored within the non-volatile memory.

The E$^2$PROM retains its contents as they are even when the power is cut off. Therefore, in general, no backup power source (capacitor) is provided for the E$^2$PROM. If, however, while data are being written in the E$^2$PROM, the power supply is cut off, for instance by removal of the battery, data can no longer be written into the E$^2$PROM and the data stored therein may be lost.

A first method of overcoming the above-noted difficulties is set forth in U.S. Pat. No. 4,733,265 and is disclosed as follows: A switch is provided in the battery chamber which detects intended removal of the battery before it is actually removed, so that abrupt cut off of the power is prevented whereby power supply time necessary for writing data in the E$^2$PROM is secured. In addition, a second method is disclosed in Japanese Patent Application (OPI) No. 61731/1985 (the term "OPI" as used herein means an "unexamined published application") in which abnormal battery voltage is detected and the contents of the RAM are thereafter written into E$^2$PROM before the power is cut off.

In the above-described first prior art method, the film count data and the data necessary for the operations of the camera are stored in the RAM in the microcomputer, and the switch detects cut off of power in advance so that the data are transferred from the RAM into the E$^2$PROM. The detecting switch operates much earlier than actual cut off of the power; for instance, in operates at the start of the removal of the battery. Thus, a power supply time period long enough to ensure writing of the data in the E$^2$PROM can be obtained.

However, the first prior art method is disadvantageous in that, since it is necessary to provide a mechanism such as a switch for detecting the removal of the battery from the battery chamber prior to the actual removal of the battery, it is necessary to provide space for the mechanism which results in increased manufacturing cost.

In the second prior art method, upon detection of the abnormal voltage of the battery, the data are written in the E$^2$PROM. However, it is considered that, at the instant of detection, it is rather difficult to obtain a power supply time period long enough to write the data. In addition, with respect to the second prior art method, in order to eliminate the use of the backup power source, in a manner similar to the first prior art method, it is necessary to provide a mechanism for detecting cut off of the power before such cut off actually occurs.

Therefore, as described above with respect to the prior art, in order to prevent cut off of power during the period in which being written in the E$^2$PROM, it is necessary to provide means for detecting cut off of power prior to actual cut off or to provide a backup power source. As a result, the camera is accordingly more intricate in construction and of increased manufacturing cost.

SUMMARY OF THE INVENTION

Accordingly, an object of this invention is to provide a data storing unit for a camera which, even if power is cut off while data are being written in a non-volatile memory, correct data can be written in the non-volatile memory after restoration of the power, and even if the power is cut off unexpectedly, the camera is operated smoothly after restoration of power. The above-noted camera of the present invention is of simple construction which eliminates the need of a mechanism for detecting cut off of power prior to actual cut off and a backup power source.

The above-noted object of the invention has been achieved by the provision of a data storing unit for a camera, which is adapted to store film count data and data necessary for the operation of the camera, which, according to the invention, comprises: a non-volatile memory; data writing means for writing the film count data in at least three addresses in the non-volatile memory successively, and for storing the data necessary for the operation of the camera together with the inverted data thereof in addresses present therefore; comparison means for subjecting the film count data written in the addresses by the data writing means to comparison and for determining whether or not the data necessary for the operation of the camera is in a correct inversion relation with the inverted data; and data rewriting means for obtaining, when a difference is present between the film count data in the addresses, a correct count value with reference to the address of the data which is determined to be different and the data necessary for the operation of the camera, and for rewriting the correct count value in the addresses, and for rewriting, when the correct inversion relation is not realized with respect to the data necessary for the operation of the camera and the inverted data thereof, correct data according to other data which has been written in the correct inversion relation.

In the data storing unit of the invention, the film count data, in the addresses, which are intended to be the same, are subjected to comparison and it is also detected whether or not the data necessary for the operation of the camera has been stored in a correct inversion relation with respect to the inverted data. Therefore, even if the power is cut off abruptly while data is being written in the non-volatile memory with the result that the data thus written is erroneous, the correct data can be rewritten. That is, when the power is restored, the erroneous data can be detected, and the data in the other addresses can be referred to in order to rewrite the correct data. Thus, after the power supply is restored, the camera can be operated smoothly. Furthermore, in the data storage unit of the invention, it is unnecessary to provide the power cut off detect mechanism or the backup power source. Hence, the data storing unit is simple in construction and low in manufacturing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitative of the present invention, and wherein:

FIGS. 2 and 3 are flow charts descriptive of the operation of the data storing unit according to the invention.

DETAILED DESCRIPTION OF THE PREFERRED EMBODIMENTS

Figures 1, 4:
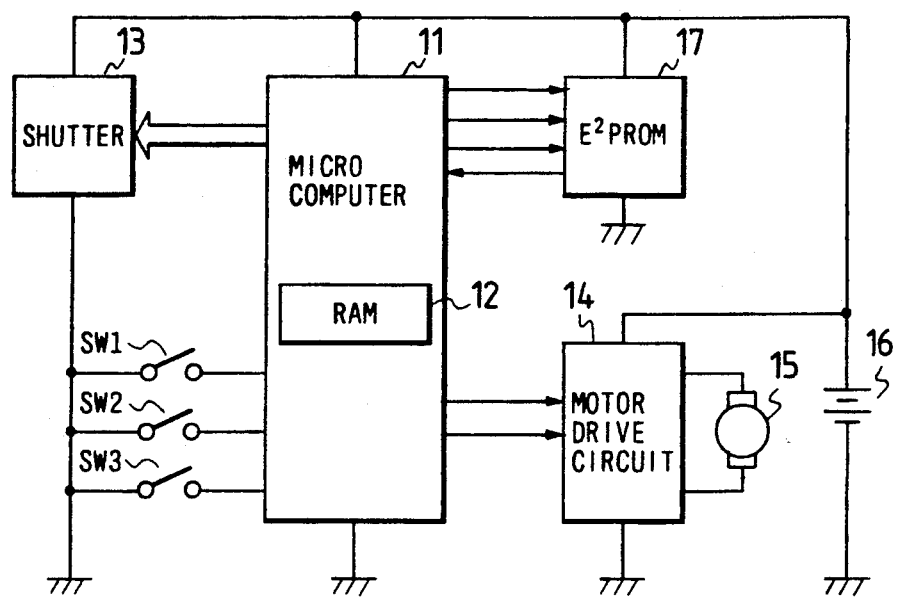
FIG. 1 is a block diagram of a data storage unit for a camera according to an embodiment of the invention.
FIG. 4 is an explanatory diagram illustrating the arrangement of a non-volatile memory in the data storing unit according to the invention.

One preferred embodiment of this invention will be described with reference to the accompanying drawings. In FIG. 1, reference numeral 11 designates a microcomputer. The microcomputer 11, incorporating a RAM 12, functions as data writing means, comparison means and rewriting means, and performs predetermined operations according to a predetermined program to control instructions supplied to a shutter 13, a motor drive circuit 14 and an E²PROM 17, as will be described subsequently. Further, in FIG. 1, reference character SW1 designates a main switch; SW2, a first release switch; and SW3, a second release switch. The main switch SW1 is turned on before the operation of the camera to apply a signal to the microcomputer 11 to allow the latter to control the camera in its entirety. The first release switch SW2 is turned on to apply a signal to the microcomputer 11 so as to cause a range finder (not shown) to perform an automatic focusing (AF) operation and to cause a photometer (not shown) to carry out a photometric operation. The second release switch SW3 is used to apply a signal to the microcomputer 11 to cause the shutter 13 to perform an exposure operation.

The first release switch SW2 is turned on by depressing a release button (not shown) halfway; and the second release switch SW3 is turned on by depressing the release button fully.

The shutter 13 is operated in response to an exposure instruction which the microcomputer 11 outputs when the second release switch is turned on. The motor drive circuit 14 operates in response to a film winding instruction provided by the microcomputer 11, to operate a film winding motor 15. Further in FIG. 1, reference numeral 16 designates a battery which is a power source for the microcomputer 11, the shutter 13, the motor drive circuit 14 and a non-volatile memory 17, or E²PROM.

Under the control of the microcomputer 11, film count data and a variety of data necessary for the operation of the camera (data for the shutter's exposure operation and the film winding operation) are written in the E²PROM 17. The data can be read from the E²PROM 17 when the microcomputer issues a read request. The data written in the E²PROM 17 are also written in the RAM 12.

When, in the above-described circuit, the battery 16 is connected, and the main switch SW1 is turned on, the microcomputer 11 operates according to the flow chart shown in FIG. 2.

Figure 3:
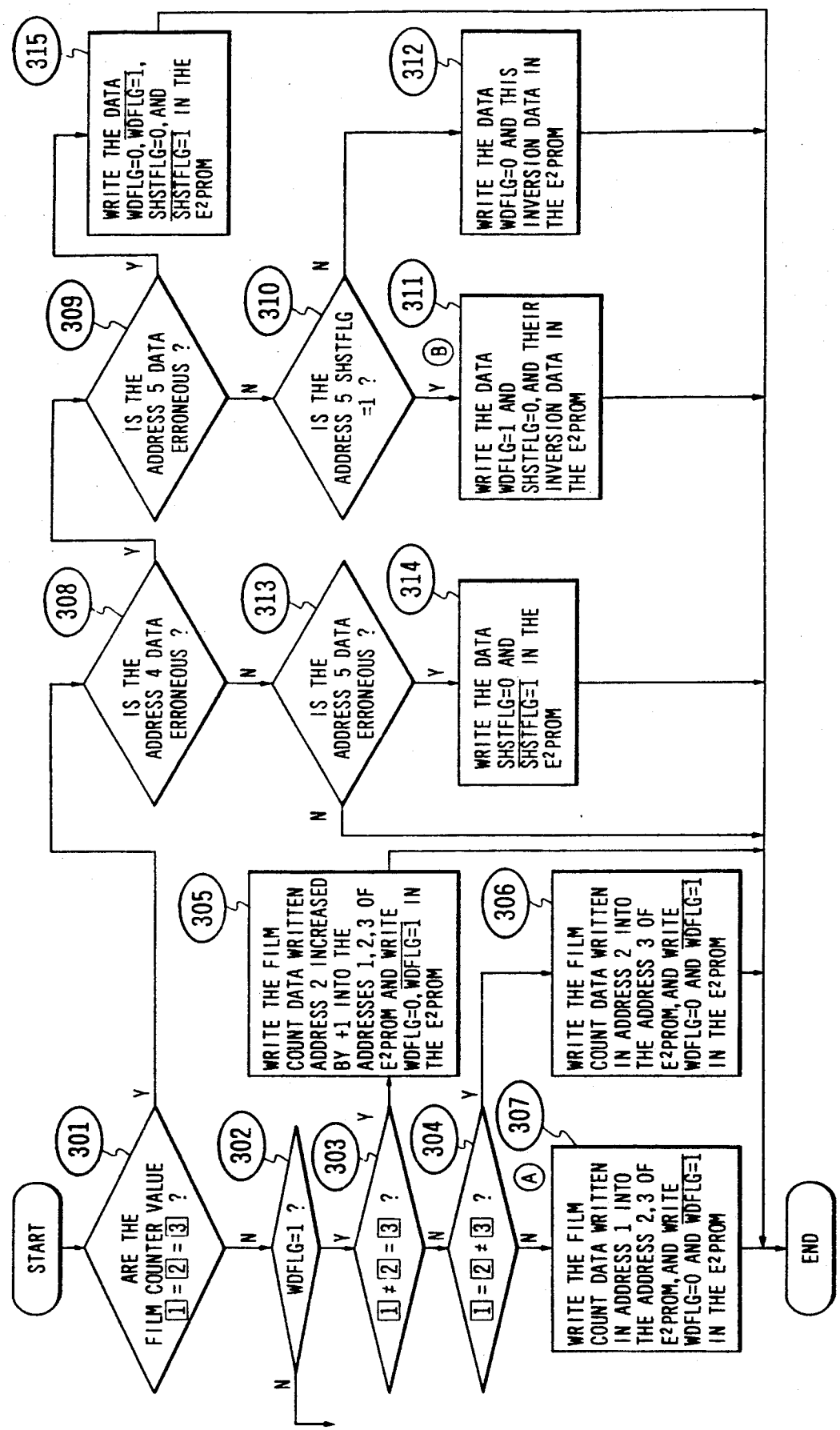

First, the contents stored in the E²PROM 17 are read out (Step 201). That is, the data written in the E²PROM 17 before power was cut off, are read out when the power is restored. Next, the data thus read are compared with one another and are subjected to a determination, as described later, and when unacceptable data is detected, correct data is rewritten in the E²PROM 17 (Step 202). In regard to the above step, if the power is cut off while data is being written in the E²PROM 17, then the data thus stored is partially erroneous, thus causing operational malfunctions regarding the operation of the camera. Therefore, it is necessary to determine whether or not the data stored in the E²PROM 17 is correct. When it is determined that part of the data is incorrect, then correct data is rewritten into the E²PROM. This operation in Step 202 will be described in more detail forthcoming with reference to FIG. 3.

The data in the E²PROM 17 which have been corrected in the above-described manner are transferred into the RAM 12 by the microcomputer 11 (Step 203).

Under these conditions, it is thereafter determined whether or not the first release switch SW2 has been turned on (Step 204). When it is determined that the first release switch SW2 has been turned on, the operating instructions are issued to perform the corresponding operations; i.e., to operate the above-described range finder and photometer (Step 205).

Next, it is determined whether or not the second release switch SW3 has been turned on (Step 206). When it is determined that the second release switch SW3 has been turned on, then it is necessary to cause the shutter 13 to perform the exposure operation as was described above. However, before the exposure operation is carried out, the following operations are carried out. In order to store the operating instruction of the shutter 13 in the memory, data "SHSTFLG=1" is set, and written both in the RAM 12 and in the E²PROM 17. As for the E²PROM, as shown in FIG. 4, data "SHSTFLG=1" is written in bit 7 of address 5 and the inverted data "$\overline{\text{SHSTFLG}}$=0" is written in bit 6 of the same address 5 (Step 207). Thereafter, the exposure instruction is issued for the shutter 13, so that the shutter 13 performs the exposure operation (Step 208).

Upon completion of the exposure operation of the shutter 13, in order to store the film winding instruction, data "WDFLG=1" is set, and written both in the RAM 12 and in the E²PROM 17. As for the E²PROM, as shown in FIG. 4, the data "WDFLG=1" is written in bit 7 of address 4, and its inverted data "$\overline{\text{WDFLG}}$=0" is written in bit 6 of the same address 4 (Step 209). At this time instant, the exposure operation of the shutter 13 has been accomplished. Therefore, the above-described data concerning the exposure operation are reset to "SHSTFLG=0" and "$\overline{\text{SHSTFLG}}$=1" and the data are written in bits 7 and 6 of address 5 of the E²PROM 17 (Step 210).

Thereafter, the film winding instruction is applied to the motor drive circuit 14 to perform the film winding operation (Step 211). Upon completion of the film winding operation (Y in Step 212), the film count value in the RAM 12 is increased by +1, the resultant value (film count data) is written in the E²PROM 17 (Step 213). At this time instant, the film winding operation has been accomplished. Therefore, the above-described data are reset to "WDFLG=0" and "$\overline{\text{WDFLG}}$=1," which are written in address 4 of the E²PROM 17 (Step 214). Thereafter, Step 204 is effected gain for the next photographing operation.

Writing of the film count data in the E²PROM 17 in Step 213 is carried out as follows: The film count value in the RAM 12 is written, as film count data, in a plurality of addresses, for instance three addresses 1, 2 and 3 in FIG. 4, successively.

If, while data is being written in the E²PROM 17, the power is abruptly cut off, for instance, by removal of the battery 16, then the data written in the E²PROM 17 becomes erroneous. For instance, when the power is cut off while the film count data is being written into one of the successive addresses of the E²PROM, the data written at this time instant in erroneous and thus is different from those written in the other of the successive addresses.

The data necessary for the operation of the camera which are to be written in addresses 4 and 5 must be in an inversion relation of the like "WDFLG=1" and "$\overline{\text{WDFLG}}$=0." However, if the power is cut off during the data writing operation, the inversion relation is not established, as a result of which the data are written incorrectly such as, for instance, "WDFLG=1" and "$\overline{\text{WDFLG}}$=1."

In order to eliminate this occurrence, Steps 201 and 202 (FIG. 2) are carried out. After restoration of the power, the contents of the E²PROM 17 are read out, and the film count data in the addresses are subjected to comparison and it is determined whether or not the data necessary for the operation of the camera are in the predetermined inversion relation to thereby detect unacceptable data. When such unacceptable data is detected, with reference to the remaining data, correct data is obtained and is rewritten in the E²PROM 17. This operation will be described with reference to the flow chart of FIG. 3 in more detail.

First, the film count data of the addresses are subjected to comparison (Step 301). It is assumed here for purpose of discussion, that the power was cut off while film count data was being written in address 2 of the E²PROM 17, as a result of which the data in address 2 is erroneous.

In this case, the data in addresses 1, 2 and 3 are not equal to one another, with "WDFLG=1." Therefore, the determination in Step 301 results in "N (No)," the determination in Step 302 results in "Y (Yes)," the determination in Step 303 results in "N," and the determination in Step 304 results in "N." Therefore, Step 307 is effected. In Step 307, the film count data correctly written in the address 1 before the cutting off of the power is rewritten in addresses 2 and 3. In this case, the film winding operation has been accomplished, and therefore data "WDFLG=0" and "$\overline{\text{WDFLG}}$=1" are rewritten in address 4.

In the case where the power was cut off while film count data was being written in address 1, the data in the address 1 is erroneous. Therefore, the determination in Step 301 results in "N," the determination in Step 302 results in "Y," and the determination in Step 303 results in "Y." Hence, Step 305 is effected. In Step 305, the film count data in address 2 is increased by the resultant data is rewritten in addresses 1, 2 and 3. In addition, the data "WDFLG=0" and "$\overline{\text{WDFLG}}$=1" are rewritten in address 4.

In the case where the power was cut off while film count data was being written in address 3, the data in the address 3 is erroneous. Therefore, the determination in Step 301 results in "N," the determination in Step 302 results in "Y," the determination in Step 303 results in "N," and the determination in Step 304 results in "Y." Therefore, Step 306 is effected. In Step 306, the film count data in address 2 is rewritten in address 3. In addition, the data "WDFLG=0" and "$\overline{\text{WDFLG}}$=1" are rewritten in address 4.

Thus, even if the power is cut off while film count data is being written, after restoration of the power, correct film count data can be restored. The data necessary for the operation of the camera; that is, the film winding data WDFLG can be stored correctly as if the power was not cut off. Thus, the operation of the camera will not be affected.

Now, the case will be described in which, the exposure operation of the shutter 13 has been accomplished, and data "WDFLG=1" has been set, and the power is cut off while the data thus set is being written in address 4 of the E²PROM 17.

In this case, the film count data is not written yet, and the data in addresses 1, 2 and 3 are equal to one another. Accordingly, the determination in Step 301 results in "Y." The data in address 4, being erroneous, is not in the predetermined inversion relation. Hence, it is determined that the data in address 4 is erroneous and the determination is Step 308 results in "Y." On the other hand, the data in address 5 remains in the predetermined inversion relations as "SHSTFLG= 1" and "$\overline{\text{SHSTFLG}}$=0". Hence, the determination in Steps 309 and 310 result in "N" and "Y," respectively, and Step 311 is effected. In Step 311, the data "WDFLG=1" and "SHSTFLG=0," and their inversion data are rewritten in the respective addresses in the E²PROM 17.

When the determination in Step 310 results in "N"; that is, when "SHSTFLG=0," then this is the case where, in Step 214 of FIG. 2 "WDFLT=0" is reset, and the power is cut off while the data thus reset is being written in the E²PROM 17. Therefore, in Step 312, the data "WDFLG=0" and its inversion data are written in address 4 of the E²PROM 17.

In the case there the data in address 4 is not erroneous ("N" in Step 308) whereas the data in address 5 is erroneous ("Y" in Step 313), Step 314 is effected, so that "SHSTELG=0" and "SHSTFLG=1" are rewritten in address 5 of the E²PROM 17.

In the case where the data in address 4 is erroneous ("Y" in Step 308) and the data in address 5 also has been destroyed ("Y" in Step 309), Step 315 is effected, so that "WDFLG=0" and "$\overline{\text{WDFLG}}$=1," and "SHSTFLG=0" and "$\overline{\text{SHSTFLG}}$=1" are rewritten in addresses 4 and 5 of the E²PROM 17, respectively.

Thus, even if the power is cut off while the data necessary for the operation of the camera; i.e., the data "WDFLG" concerning the film winding operation and the data "SHSTFLG" concerning the exposure operation of the shutter 13 is being written, correct data can be stored after restoration of the power, so that the operation of the camera will not be affected at all.

As was described above, with the data storing unit of the invention, even if the power is cut off abruptly while data is being written in the non-volatile memory, correct data can be rewritten therein after restoration of the power. Therefore, the camera can be operated satisfactorily after the power supply is restored. Furthermore, in the invention, unlike the prior art, it is unnecessary to provide a mechanism for detecting the cut off of the power supply prior to such an occurrence or a backup power source. Thus, the data storing unit of the invention is simple in construction, which effectively prevents increases in manufacturing cost.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A data storage unit in a camera which stores film count data and first and second operational data of the camera, comprising:
   a non-volatile memory;
   data writing means for writing into said non-volatile memory the film count data successively in at least three addresses and for writing the operational data and inverted operational data in preset addresses;
   comparison means for subjecting the film count data written in said at least three addresses to comparison therebetween and for determining whether the operational data is in correct inversion relation with the inverted operational data; and
   data rewriting means, coupled to said non-volatile memory and said comparison means, for
      obtaining, when a difference is determined between the film count data in said at least three addresses, a correct film count data based upon the film count data which are not different and the operational data,
      rewriting the correct film count data in said at least three addresses, and
      rewriting, when the correct inversion relation is not determined, corrected operational data according to which of the first and second operational data been written in the correct inversion relation.

2. The data storage unit of claim 1, the first and second operational data respectively being shutter exposure and film winding commands.

3. The data storage unit of claim 2, said non-volatile memory is an E²PROM.

4. A data storage unit in a camera, which stores film count data and data necessary for the operation of the camera, the data necessary for the operation of the camera including shutter and film wind commands, comprising:
   a non-volatile memory;
   data rewriting means successively writing the film count data in at least three addresses in said non-volatile memory and for writing the data necessary for the operation of the camera together with the inverted data thereof in preset addresses;
   comparison means for subjecting the film count data written in said preset addresses by said data writing means to comparison therebetween and for determining whether the data necessary for the operation of the camera is in a correct inversion relation with the inverted data; and
   data rewriting means, coupled to said non-volatile memory and said comparison means, for
      obtaining, when a difference is present between the film count data in said at least three addresses, a correct film count data based upon the film count data judged in said comparison means to be equal,
      rewriting the correct film count data in said at least three addresses, and
      rewriting, when the correct inversion is not determined, corrected data based upon which of the shutter and film wind commands are in the correct inversion relation.

5. A camera data storage power failure protection system, for protecting data written into a non-volatile memory during the occurrence of a power failure, comprising:
   data writing means, coupled to the non-volatile memory, for writing a film count value in different plural address locations and for writing first and second operational data and inverted operational data in preset address locations of the non-volatile memory; and
   power failure protection means, coupled to the non-volatile memory, operable upon restoration of power for
      comparing said film count value stored in said different plural address locations to determine correspondence therebetween,
      rewriting a corrected film count value, based upon which of said different plural address locations has a stored film count value different from said film count value, into said different plural address locations,
      comparing whether said operational data and said inverted operational data are in correct inversion relationships, and
      rewriting corrected operational data, based upon which of said first and second operational data and said inverted operational data are determined to be in said correct inversion relationships.

6. The camera data storage power failure protection system of claim 5, said different plural address locations comprising three successive address locations.

7. The camera data storage power failure protection system of claim 6, said film count value of the second of said three successive address locations being incremented by one count and being rewritten as said corrected film count value into said three successive address locations when said power failure protection means determines that said film count value of the first of said three successive address locations is different from that of the second and third of said three successive address locations.

8. The camera data storage power failure protection system of claim 6, said film count value of the first of said three successive address locations being rewritten as said corrected film count value into the second and third of said three successive address locations when said power failure protection means determines that said film count value of the second of said three successive address locations is different from that of the first and third of said three successive address locations.

9. The camera data storage power failure protection system of claim 6, said film count value of the second of said three successive address locations being rewritten as said corrected film count value into the third of said three successive address locations when said power failure protection means determines that said film count value of the third of said three successive address location is different from that of the first and second of said three successive address locations.

10. The camera data storage power failure protection system of claim 6, said first and second operational data comprising respectively film wind and shutter exposure commands, high levels thereof indicative of assertion of the commands.

11. The camera data storage power failure protection system of claim 10, said film wind and shutter exposure commands both being rewritten at a low level as said corrected operational data when said power failure protection means determines that said film count value of each of said three successive address locations are the same and that said inversion relationship of each of said film wind and shutter exposure commands are incorrect.

12. The camera data storage power failure protection system of claim 10, said shutter exposure command being rewritten at a low level as said corrected operational data when said power failure protection means determines that said film count value of each of said three successive address locations are the same and that said inversion relationship of each of said film wind and shutter exposure commands are respectively correct and incorrect.

13. The camera data storage power failure protection system of claim 10, said film wind and shutter exposure commands being rewritten respectively at a high level and a low level as said corrected operational data when said power failure protection means determines that said film count value of each of said three successive address locations are the same, said inversion relationship of each of said film wind and shutter exposure command are respectively incorrect and correct, and said shutter exposure command is originally set at a high level.

14. The camera data storage power failure protection system of claim 10, said film wind command being rewritten at a low level as said corrected operational data when said power failure protection means determines that said film count value of each of said three successive address locations are the same, said inversion relationship of each of said film wind and shutter exposure commands are respectively incorrect and correct and said shutter exposure command is originally set at a low level.

15. A camera data storage protection system, for protecting data written into a non-volatile memory during the occurrence of power failure, comprising:
data writing means, coupled to the non-volatile memory, for writing a film count value in three successive address locations of the non-volatile memory; and
power failure protection means, coupled to the non-volatile memory, operable upon restoration of power for
comparing said film count value stored in said three successive address locations to determine correspondence therebetween, and
rewriting a corrected film count value, based upon which of said three successive address locations has a stored film count value different from said film count value, into said three successive address locations.

16. The camera data storage protection system of claim 15, said data writing means operable further for writing operational data comprising film wind and shutter exposure commands and inverted commands thereof, respectively, in preset address locations of the non-volatile memory, said power failure protection means further operable upon restoration of power for
comparing whether said commands and inverted commands are respectively in correct inversion relationships, and
rewriting corrected operational data based upon which of said operational data are written in said correct inversion relationships.

17. A camera data storage protection system, for protecting data written into a non-volatile memory during the occurrence of power failure, comprising:
data writing means, coupled to the non-volatile memory, for writing operational data comprising film wind and shutter exposure commands and inverted commands thereof, respectively, in preset address locations of the non-volatile memory; and
power failure protection means, coupled to the non-volatile memory, operable upon restoration of power to
compare whether said commands and inverted commands are respectively in correct inversion relationships, and
rewrite corrected operational data based upon which of said operational data are written in said correct inversion relationships.

18. The camera data storage protection system of claim 17, said data writing means further operable to write a film count value in three successive address locations of the non-volatile memory, said power failure protection means further operable upon restoration of power to
compare said film count value stored in said three successive address locations to determine correspondence therebetween, and
rewrite a corrected film count value, based upon which of said three successive address locations has a stored film count value different from said film count value, into said three successive address locations.

19. A method of protecting camera data from power failure during writing of the camera data into a non-volatile memory comprising the steps of:
writing a film count value in different plural address locations and first and second operational data and inverted operational data in preset address locations of the non-volatile memory;
comparing, after restoration of power, said film count value stored in said different plural address locations to determine correspondence therebetween and whether said operational data and said inverted operational data and are in correct respective inversion relationships;
rewriting into said different plural address locations a corrected film count value based upon which of said different plural address locations has a stored film count value different from said film count value; and
rewriting into said preset address locations corrected operational data, based upon which of said first and second operational data and said inverted operational data are determined to be in said correct inversion relationships.

20. The method of protecting camera data of claim 19, said step of writing comprising writing said film count value into three successive address locations.

21. The method of protecting camera data of claim 19, said first and second operational data written into said preset address locations being film wind and shutter exposure commands, respectively.

* * * * *

UNITED STATES PATENT AND TRADEMARK OFFICE
CERTIFICATE OF CORRECTION

PATENT NO. : 5,079,585
DATED : January 7, 1992
INVENTOR(S) : Masatoshi YAMADA

It is certified that error appears in the above-indentified patent and that said Letters Patent is hereby corrected as shown below:

On the title page, item [73], please change "Kabyshiki" to --Kabushiki--.

Signed and Sealed this

Fifteenth Day of August, 1995

Attest:

BRUCE LEHMAN

*Attesting Officer*     *Commissioner of Patents and Trademarks*